US009108650B2

(12) United States Patent
Lundgren

(10) Patent No.: US 9,108,650 B2
(45) Date of Patent: Aug. 18, 2015

(54) RAIL VEHICLE BRAKE ACTUATOR WITH A BRAKE BLOCK HOLDER

(75) Inventor: Magnus Lundgren, Hörby (SE)

(73) Assignee: Faiveley Transport Nordic AB, Landskrona (SE)

( * ) Notice: Subject to any disclaimer, the term of this patent is extended or adjusted under 35 U.S.C. 154(b) by 3 days.

(21) Appl. No.: 14/009,805

(22) PCT Filed: Apr. 4, 2012

(86) PCT No.: PCT/SE2012/050371
§ 371 (c)(1),
(2), (4) Date: Dec. 13, 2013

(87) PCT Pub. No.: WO2012/138291
PCT Pub. Date: Oct. 11, 2012

(65) Prior Publication Data
US 2014/0090936 A1  Apr. 3, 2014

(30) Foreign Application Priority Data

Apr. 6, 2011  (SE) ...................................... 1150302

(51) Int. Cl.
*B61H 13/00* (2006.01)
*B61H 1/00* (2006.01)
(Continued)

(52) U.S. Cl.
CPC .............. *B61H 13/005* (2013.01); *B60T 11/16* (2013.01); *B61H 1/003* (2013.01); *F16D 55/2245* (2013.01); *F16D 65/092* (2013.01); *F16D 69/0408* (2013.01)

(58) Field of Classification Search
CPC ........ B61H 1/003; B61H 13/005; B61H 1/00; F16D 69/0416; F16D 65/092; F16D 55/2245; F16D 65/062; F16D 49/16

USPC ........... 188/206 R, 215, 153 R, 220.1, 219.6, 188/219.1
See application file for complete search history.

(56) References Cited

U.S. PATENT DOCUMENTS 1,199,932 A * 10/1916 Schwentler ............... 188/206 R
2,516,696 A *  7/1950 Gothberg ..................... 188/207
(Continued)

FOREIGN PATENT DOCUMENTS

EP  0 077 586   4/1983
EP  0503723     9/1992
(Continued)

OTHER PUBLICATIONS

International Search Report for International Application No. PCT/SE2012/050371 mailed Jun. 18, 2012 (4 pages).
(Continued)

*Primary Examiner* — Thomas J Williams
*Assistant Examiner* — Mariano Sy
(74) *Attorney, Agent, or Firm* — Merchant & Gould P.C.

(57) ABSTRACT

A rail vehicle brake actuator (1) has a brake block holder (4) suspended therefrom so as to be laterally movable during braking. Upper ends of brake block hangers (5) are attached to brackets (2) on the actuator (1) by a joint (15) allowing relative laterally pivotable and rotatable movements of lower ends of the brake block hangers to the brake block holder. The lower ends of the brake block hangers (5) are laterally pivotally attached to a movable brake block holder axle (16) extending through a transverse bore in the brake block holder (4), and spring mechanisms (21) are arranged to act between the respective brake block hangers and the brake block holder.

9 Claims, 5 Drawing Sheets

(51) Int. Cl.
*B60T 11/16* (2006.01)
*F16D 55/224* (2006.01)
*F16D 65/092* (2006.01)
*F16D 69/04* (2006.01)

(56) References Cited

U.S. PATENT DOCUMENTS

| | | | | |
|---|---|---|---|---|
| 2,666,506 | A | * | 1/1954 | Bachman ................. 188/206 R |
| 2,768,713 | A | * | 10/1956 | Tack ........................ 188/205 R |
| 2,940,553 | A | * | 6/1960 | Newell et al. ............ 188/153 R |
| 4,000,792 | A | * | 1/1977 | Guldin ......................... 188/242 |
| 4,287,968 | A | | 9/1981 | Stensson et al. |
| 4,378,864 | A | * | 4/1983 | Stjarne ..................... 188/153 R |
| 4,630,714 | A | | 12/1986 | Stjarne et al. |
| 5,062,505 | A | * | 11/1991 | Sjarne et al. ............ 188/153 R |
| 5,240,091 | A | | 8/1993 | Stjarne |
| 5,242,037 | A | * | 9/1993 | Stjarne ..................... 188/206 R |
| 5,277,280 | A | * | 1/1994 | Stjarne .......................... 188/217 |
| 6,938,739 | B2 | * | 9/2005 | Korleski et al. ........... 188/220.6 |
| 7,165,659 | B2 | * | 1/2007 | Staltmeir et al. ................ 188/52 |
| 8,360,214 | B2 | * | 1/2013 | Mathern et al. ............ 188/220.1 |
| 2010/0258393 | A1 | | 10/2010 | Mathern et al. |

FOREIGN PATENT DOCUMENTS

| | | |
|---|---|---|
| EP | 0 665 152 | 8/1995 |
| GB | 2337238 | 11/1999 |

OTHER PUBLICATIONS

Chinese Office Action for CN Application No. 201280017010.5 mailed May 4, 2015 (9 pages).

* cited by examiner

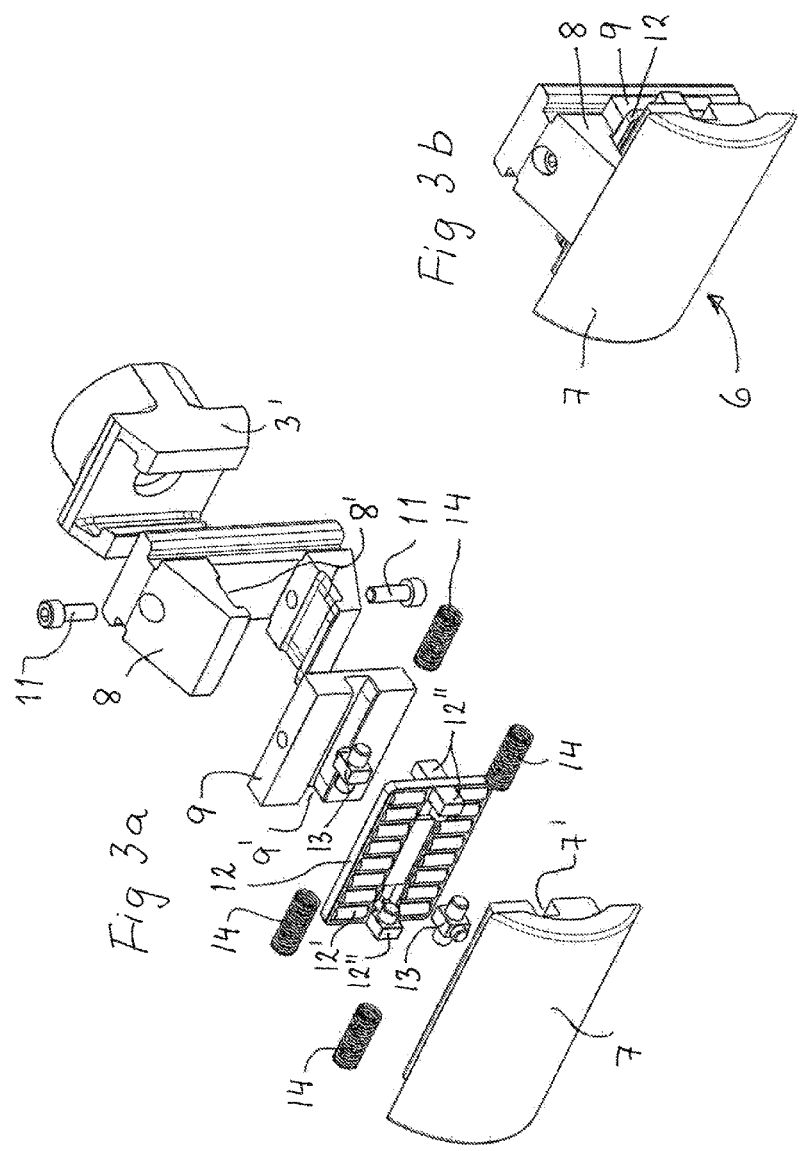

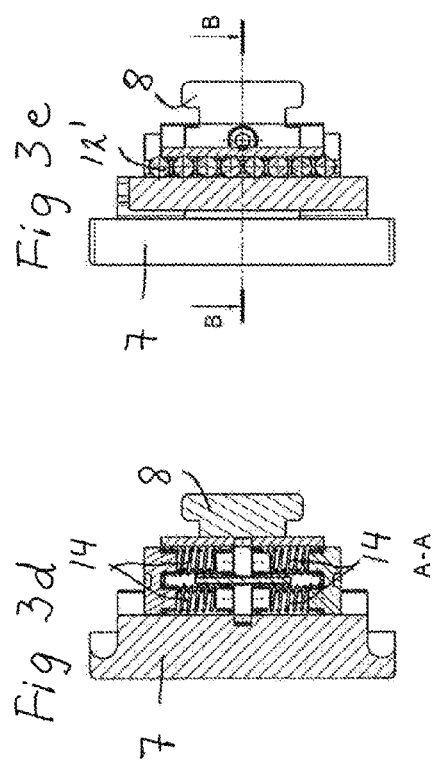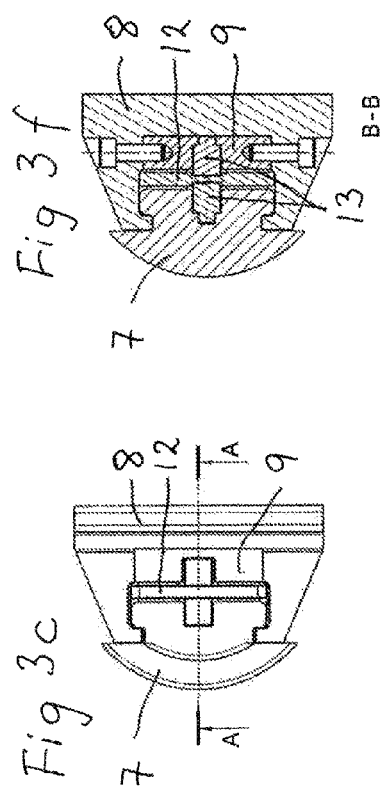

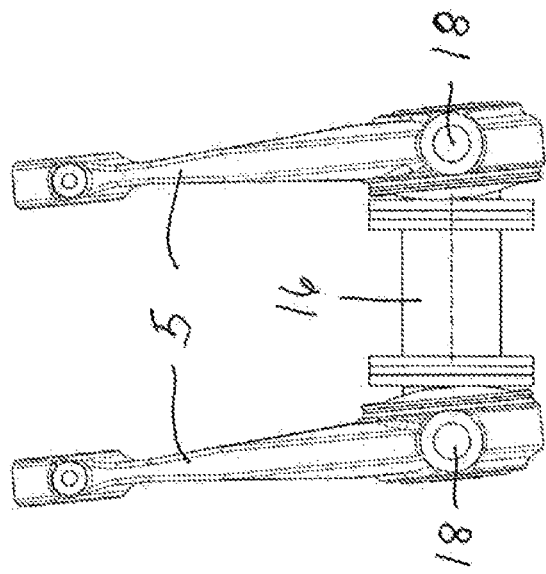
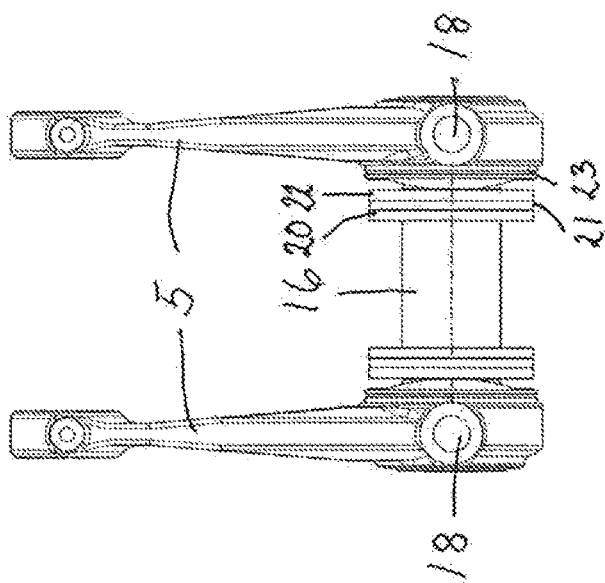

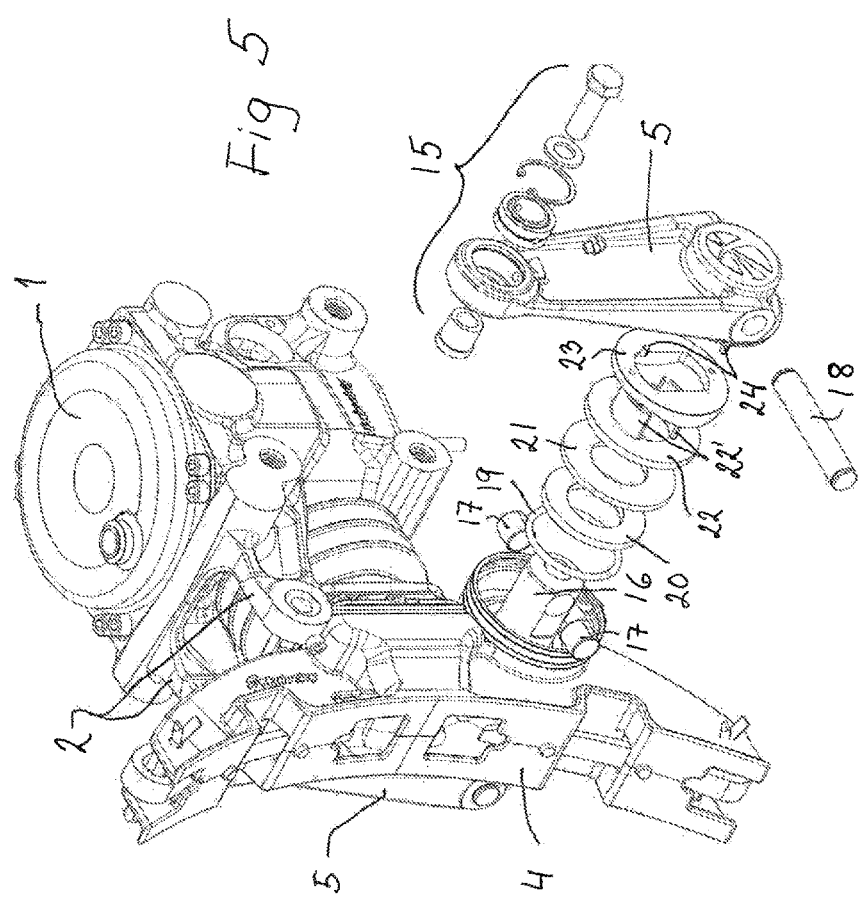

RAIL VEHICLE BRAKE ACTUATOR WITH A BRAKE BLOCK HOLDER

This application is a National Stage Application of PCT/SE2012/050371, filed 4 Apr. 2012, which claims benefit of Serial No. 1150302-6, filed 6 Apr. 2011 in Sweden and which applications are incorporated herein by reference. To the extent appropriate, a claim of priority is made to each of the above disclosed applications.

TECHNICAL FIELD

The present invention relates to a rail vehicle brake actuator with a brake block holder suspended therefrom so as to be laterally movable during braking, wherein brake block hangers are attached at their upper ends to brackets on the actuator by means of a joint allowing relative laterally pivotable and rotatable movements and at their lower ends to the brake block holder.

BACKGROUND OF THE INVENTION

Different constructions for enabling lateral movements of a brake block holder suspended from a rail vehicle brake actuator have been proposed over the years. The purpose of such lateral movements is to enable brake application of a brake block (attached to the brake block holder) against the tread of a wheel, which is part of a laterally movable wheel set (two wheels on a wheel axle). The control of the lateral movements of the brake block holder occurs mainly by the flange of the wheel to be braked.

Such a construction is shown in EP-B-0 503 723, where each brake block hanger consists of a leaf spring for allowing the desired lateral movements. The leaf springs are arranged in a non-symmetrical casing, open towards the wheel to be braked. A rigid flat bar is arranged at the wheel flange sided leaf spring in order to inhibit the deflection thereof in that direction.

This construction is rather bulky and costly, and different, inverted versions have to be used at wheels to the right and to the left, respectively, on a wheel axle due to the non-symmetrical character of the construction. The capacity for lateral movements may in practice be rather limited.

THE INVENTION

The main objects of the invention are to attain a construction, which is less bulky and costly than previous ones and is symmetrical, so that the same unit may be used for either wheel in a wheel set. A further object is to increase the capability of the construction for lateral movements in relation to earlier constructions. A still further object is to create a type of modulus system, where a standard brake actuator housing may be used for different applications, for example for a brake block holder design according to the invention.

This is according to the invention attained in that the lower ends of the brake block hangers, which are rigid, are laterally pivotally attached to a movable brake block holder axle extending through a transverse bore in the brake block holder and that spring means are arranged between the respective brake block hangers and the brake block holder.

The pivotal connection between each brake block hanger and the brake block holder axle may be obtained in that each end of the axle and the lower end of each brake block hanger are provided with a transverse bore, through which a brake block hanger axle extends.

In a practical case each spring means may be a cup spring arranged on the brake block holder axle.

For obtaining a practical design for the force-transmission from the cup spring to the other parts of the construction and for allowing the pivotal movements between the brake block hanger and the brake block holder axle, the cup spring is clamped between a stop washer in engagement with the brake block holder and a push washer, both arranged on the brake block holder axle, wherein the push washer is non-rotationally connected to a cam washer non-rotationally connected to the brake block hanger.

By this design a friction force will be applied on the brake block holder by the stop washer, which will assist in resiliently holding the brake block holder in a generally vertical position and prevent it from rotating around the brake block holder axle.

As the brake block holder is movable in the lateral direction but also in other directions due to its suspension, force transmitting means, arranged between an axially movable push rod of the actuator and the brake block holder, have to be arranged to allow movements in different directions of the latter in relation to the former.

In a practical case the main constituents of the force transmitting means are a holder with a guide member, the holder being slidably connected to a push rod end piece for movements in a first direction, and a slide plate in engagement with the back-side of the brake block holder, the slide plate being slidably connected to the guide member for movements in a second direction perpendicular to the first one.

Preferably, there is a dovetail connection between the holder and the push rod end piece for movements in the vertical direction, whereas the slide plate is guided by a groove in the guide member for movements in the horizontal direction.

A bearing plate may preferably be arranged between the slide plate and the guide member, the bearing plate being provided with guide protrusions for engagement on one hand with the guide member groove, on the other hand with a guide groove in the back-side of the slide plate.

One or more centering springs may preferably be arranged to bias the slide plate to a centered position in relation to the guide member.

BRIEF DESCRIPTION OF THE DRAWINGS

The invention shall be described in further detail below under reference to the accompanying drawings, in which FIG. 3a is an exploded view of a force transmitting mechanism between the brake actuator and the brake block holder according to the invention, FIG. 3b is an isometric view of the force transmitting mechanism in mounted condition, FIG. 3c is a side view of the force transmitting mechanism of FIG. 3b, FIG. 3d is a section along the lines A-A in FIG. 3c, FIG. 3e is a top view of the force transmitting mechanism with certain portions broken-away, FIG. 3f is a section along the lines B-B in FIG. 3e, FIG. 4a illustrates the brake block hangers in a neutral, vertical position, FIG. 4b illustrates the brake block hangers in a laterally displaced position, and FIG. 5 is an isometric view generally corresponding to FIG. 1 but with a certain portion of the construction in an exploded view.

DETAILED DESCRIPTION

Figure 1:
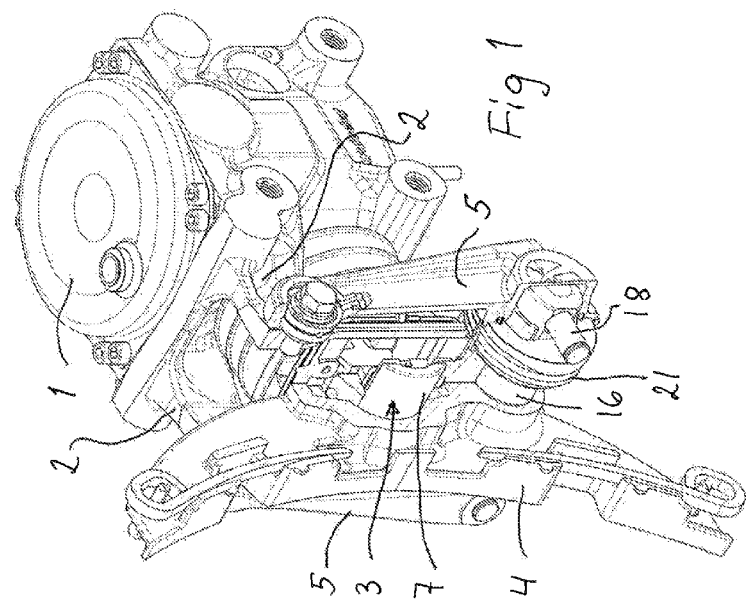
FIG. 1 is an isometric view of a rail vehicle brake actuator with a brake block holder according to the invention, wherein portions of the construction are broken away.

A conventional brake actuator 1 per se forming no part of the invention and normally including a brake cylinder and a slack adjuster (so as to form a brake unit) is provided with brake block hanger brackets 2 extending out from the actuator in the same general direction as a push rod 3 of the actuator.

Without going into details at this stage, a brake block holder 4 is suspended in two rigid brake block hangers 5, rotatably attached to its respective bracket 2 at their respective upper ends and to a lower part of the brake block holder 4 at their lower ends. The brake block holder 4 is centrally actuated by the push rod 3 of the actuator 1 for braking engagement with the tread of a wheel (not shown) of the rail vehicle on which the brake actuator 1 is mounted.

FIG. 3a is an exploded view of a force transmitting mechanism 6, which may be seen as a prolongation or part of the actuator push rod 3 and is connected thereto. FIG. 3b shows this mechanism 6 in a mounted condition. The purpose of the mechanism is to allow relative movements both vertically and horizontally between a push rod end piece 3' and an arc-shaped slide plate 7, intended for engagement with a correspondingly shaped recess in the back-side of the brake block holder, as is visible in FIG. 1 (where the reference numeral 3 denotes the functional combination of the push rod and the force transmitting mechanism).

A holder 8 can form a dovetail joint or similar joint with the push rod end piece 3' so as to allow vertical relative movements. The push rod end piece 3' is shown as being provided with dovetail grooves and the holder 8 with dovetail tongues. A guide member 9 is attached to the holder 8 by means of transverse grooves 8' and screws 11, as is readily understood by the person skilled in the art. The guide member 9 is provided with a longitudinal groove 9', which in the mounted condition of the mechanism is horizontal.

As a modification, the holder 8 and the guide member 9 may be integrated into one piece, whereby the screws 11 may be omitted.

A bearing plate 12 is provided with a number of bearing rollers 12' and guide protrusions 12" for guidingly extending into on the one hand the guide member groove 9' and on the other hand a corresponding guide groove 7' in the back-side of the slide plate 7.

As is clearly visible in FIG. 3c, there is also a dovetail joint or equivalent joint between the holder 8 and the slide plate 7. The holder 8 is provided with dovetail grooves perpendicular to the aforementioned dovetail tongues of the holder 8, and the slide plate 7 is provided with dovetail tongues. The dovetail grooves have a proper width also to accommodate the bearing plate 12 between the guide member 9 and the slide plate 7.

As will be understood, the force transmitting mechanism described so far will enable free vertical and horizontal movements of the slide plate 7 in relation to the push rod end piece 3'. However, there is also a desire to provide a bias on the slide plate 7 to a horizontal neutral or center position in relation to the push rod piece 3'. This bias can be attained in the following way.

Spring supports 13 are held by engagement between lugs thereon and corresponding recesses in the bottoms of the guide grooves 7' and 9' in the slide plate 7 and the guide member 9, respectively. Centering springs 14 of the compression type are arranged between the spring supports 13 and the guide protrusions 12" for providing the desired bias. This bias may alternatively be provided by only one spring.

The slide plate 7 is arranged to engage a curved recess in the back side of the brake block holder 4. In a way known per se (spring 16 in EP 0 077 586) but not explicitly shown in the drawings, the brake block holder 4 is biased by a spring arrangement into engagement with the slide plate 7 and is thus prevented from rotating forward around a brake block holder axle 16 (described below).

The construction of the brake block hangers 5 is now to be described. The basic requirement is that the brake block hangers 5 shall enable a brake block attached to the brake block holder 4 to be brakingly applied to the tread of a wheel with a certain lateral movability in relation to the brake actuator 1. This means that the brake block hangers 5 according to the invention, which per se are not flexible, shall be pivotally connected to both the brake actuator 1 and the brake block holder 4 not only in a plane parallel to a centerline of the actuator 1 and the brake block holder 4 but also in a plane perpendicular thereto, as is illustrated in FIGS. 4a and 4b. FIG. 4a illustrates the situation where the tread of wheel to be braked is directly in front of the actuator 1 and the brake block hangers 5 are vertical. In FIG. 4b on the other hand the wheel tread is laterally displaced, which means that the brake block hangers 5 are tilted (under the influence of the wheel flange of the laterally displaced wheel to be braked).

Figure 2:
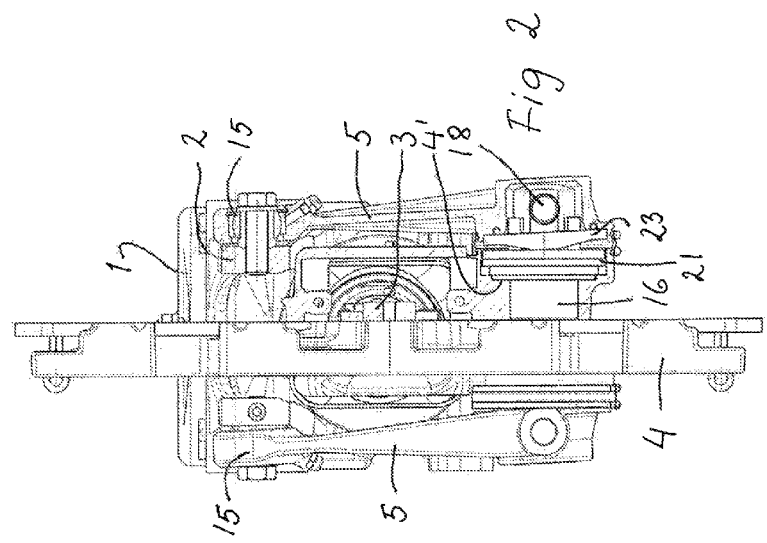
FIG. 2 is an end view or a view generally from the left in FIG. 1, certain portions also being broken away in the view.

The pivotal connection of each brake block hanger 5 to its bracket 2 is in the form of a ball joint 15, whose design will not be described in detail but appears clearly to the person skilled in the art from the drawings, especially in the upper right portion of FIG. 2, but also in the right portion of FIG. 5.

The lower pivotal connection of each brake block hanger 5 to the brake block holder 4 is constructed as follows, reference being made to FIGS. 1, 2, 4a,b, and 5, but initially mainly to FIG. 5:

A holder axle 16 extends through a transverse bore in the brake block holder 4. The detailed construction is shown at the right hand side of the holder axle 16, but there is the corresponding construction at the left hand side. The holder axle 16 has a transverse bore towards its end, and slide bearings 17 are provided in this bore. Each brake block hanger 5 is towards its lower end provided with a transverse bore and a recess (FIGS. 1 and 2) for accommodating the end of the holder axle 16. A hanger axle 18 is to extend through the bores of the hanger 5 and the holder axle 16, so that the hanger 5 can pivot in relation to the holder axle 16.

Arranged between a shoulder 4' (FIG. 2) and the brake block hanger 5 are a sealing O-ring 19, a stop washer 20 engaging the shoulder 4', a cup spring or Belleville washer 21, a push washer 22, and a cam washer 23.

The cam washer 23 is connected to the brake block hanger 5 by means of pins 24 and is provided with a cam, most clearly visible in FIG. 2, for allowing pivotal movements of the hanger 5 in relation to the push washer 22 and the rest of the described construction. The push washer 22 is provided with carrier protrusions 22' for carrying engagement with the cam washer 23.

By the engagement between the stop washer 20 and the brake block holder shoulder 4', a friction force will be applied from the cup spring 21 to the brake block holder 4, so that the latter will be assisted in being resiliently held in the generally vertical position.

Words such as "upper", "lower", "vertical", or the like are only meant to refer to the position of the brake actuator shown in the drawing figures and shall not be construed as limiting the scope of the claims.

Modifications are possible within the limits of the appended claims.

The invention claimed is:

1. A rail vehicle brake actuator comprising a brake block holder suspended therefrom by brake block hangers so as to be laterally movable during braking, each brake block hanger comprising an upper end and a lower end, wherein the rail vehicle brake actuator comprises brackets, and wherein the upper ends of each of the brake block hangers are attached to the brackets on the rail vehicle brake actuator by a joint allowing laterally pivotable and rotatable movements of the lower ends of the brake block hangers relative to the brake block holder, wherein the lower ends of the brake block hangers are laterally pivotally attached to a movable brake block holder axle extending through a transverse bore in the brake block holder, and wherein a spring mechanism is arranged to act between each of the brake block hangers and the brake block holder.

2. The rail vehicle brake actuator of claim 1, wherein each end of the brake block holder axle and the lower end of each brake block hanger are provided with a transverse bore, through which a brake block hanger axle extends.

3. The rail vehicle brake actuator of claim 1, wherein each spring mechanism is a cup spring arranged on the brake block holder axle.

4. The rail vehicle brake actuator of claim 3, wherein the cup spring is clamped between a stop washer in engagement with the brake block holder and a push washer, both arranged on the brake block holder axle, wherein the push washer is non-rotationally connected to a cam washer non-rotationally connected to the brake block hanger.

5. The rail vehicle brake actuator of claim 1, wherein force transmitting means are arranged between an axially movable push rod of the actuator and the brake block holder and are arranged to allow movements in different directions of the brake block holder in relation to the actuator.

6. The rail vehicle brake actuator of claim 5, wherein the force transmitting means comprises a holder with a guide member, the holder being slidably connected to a push rod end piece for movements in a first direction, and a slide plate in engagement with a back side of the brake block holder, the slide plate being slidably connected to the guide member for movements in a second direction perpendicular to the first direction.

7. The rail vehicle brake actuator of claim 6, wherein there is a dovetail connection between the holder and the push rod end piece for movements in a vertical direction, whereas the slide plate is guided by a groove in the guide member for movements in a horizontal direction.

8. The rail vehicle brake actuator of claim 7, wherein a bearing plate is arranged between the slide plate and the guide member, the bearing plate being provided with a first set of guide protrusions for engagement with the guide member groove, and a second set of guide protrusions for engagement with a guide groove in a back side of the slide plate.

9. The rail vehicle brake actuator of claim 8, wherein centering springs are arranged to bias the slide plate to a centered position in relation to the guide member.

* * * * *